(12) United States Patent
Siraky et al.

(10) Patent No.: US 7,336,205 B2
(45) Date of Patent: Feb. 26, 2008

(54) ROTARY ENCODER

(75) Inventors: Josef Siraky, Donaueschingen (DE); August Goetz, Donaueschingen (DE)

(73) Assignee: Sick Stegmann GmbH, Donaueschingen (DE)

( * ) Notice: Subject to any disclaimer, the term of this patent is extended or adjusted under 35 U.S.C. 154(b) by 0 days.

(21) Appl. No.: 11/472,548

(22) Filed: Jun. 22, 2006

(65) Prior Publication Data
US 2006/0290534 A1 Dec. 28, 2006

(30) Foreign Application Priority Data
Jun. 23, 2005 (DE) .................. 10 2005 029 678

(51) Int. Cl.
*H03M 1/22* (2006.01)
(52) U.S. Cl. ........................... 341/15; 341/1
(58) Field of Classification Search ............. 341/10–20
See application file for complete search history.

(56) References Cited
U.S. PATENT DOCUMENTS
5,705,778 A * 1/1998 Matsui et al. ............. 200/11 R
6,029,529 A 2/2000 Recker et al.

FOREIGN PATENT DOCUMENTS
| DE | 100 23 196 A1 | 11/2001 |
|---|---|---|
| DE | 203 16 971 U1 | 3/2004 |
| EP | 0 704 702 A1 | 4/1996 |

* cited by examiner

*Primary Examiner*—Lam T. Mai
(74) *Attorney, Agent, or Firm*—The Nath Law Group; Jerald L. Meyer; Jonathan A. Kidney

(57) ABSTRACT

A rotary encoder exhibits a shaft, which can be coupled in torque-proof fashion to a rotating object to be measured. The shaft is connected at a true angle of rotation to a material measure and is divided axially into a drive section (10), which can be coupled to the measured object, and an output section (12), which is connected to the material measure. The drive section (10) and the output section (12) are connected in torsionally rigid but axially resilient fashion by an intermediate element (26), which takes the form of a disk.

9 Claims, 3 Drawing Sheets

ROTARY ENCODER

DESCRIPTION

The invention relates to a rotary encoder. More particularly, the invention relates to an enhanced jolt-resistant rotary encoder.

Rotary encoders serve to measure angle-dependent magnitudes, such as the angular position, angular speed, and angular acceleration of a rotating object, e.g., the shaft of a motor. To this end, the rotary encoder exhibits a shaft which is coupled in torque-proof fashion to the rotating object that is being measured, e.g., the motor shaft. Connected to the shaft at a true angle of rotation is a material measure, which is scanned by a suitable scanning device to generate angle-dependent signals.

As determined by the given system, a rotating object that is being measured may execute a certain axial movement. This axial movement of the measured object is transmitted to the shaft of rotary encoder coupled to the object. If the shaft of the sensor is rigidly coupled to the measured object, the axial movements and jolts to the measured object are directly transmitted to the material measure by the shaft of the rotary encoder. This kind impact-specific load on the material measure may result in damage and a shortened operating life of the rotary encoder.

In order to prevent axial jolts to the measured object from being transmitted to the shaft of the rotary encoder, flexible couplings, e.g., bellows couplings, are used to connect the measured object to the shaft. The flexible properties of this coupling also reduce the torsional rigidity of the connection between the measured object and the shaft of the sensor, and this may impede measuring accuracy. The use of such a coupling may also increase the axial dimensions required to mount the rotary encoder.

The goal of the invention is to create a rotary encoder which is less impaired by axial jolts to the measured object.

This invention solves this problem with a rotary encoder exhibiting features as described herein.

In accordance with the invention, the shaft of the rotary encoder is divided into a drive section and an output section. The drive section is coupled to the object being measured. The output section is connected to the material measure in torque-proof fashion. Positioned between the drive section and the output section is an intermediate element, which yields elastically in the axial direction, but is as rotationally rigid as possible. With its drive section the shaft can be rigidly coupled to the measured object, so that the rotary encoder is connected to the measured object with complete torsional rigidity. Axial jolts or impacts to the measured object are thus transmitted with full strength to the drive section of the shaft, but the axial resilience of the intermediate element ensures that these axial impacts are transmitted to the output section, and thus to the material measure, in dampened fashion. The intermediate element has a high degree of torsional rigidity, with the result that the rotation of the drive section coupled to the measured object is transmitted to the output section with high angular fidelity, and thus to the material measure of the actual measuring device.

The demands for elastic axial resilience and torsional rigidity are advantageously combined and met when the intermediate element is designed as a disk that is coaxial to the shaft and is axially inserted between the drive section and the output section, and when the radius of the disk is greater than its axial thickness. The elastic properties of the material used for the intermediate element, along with its axial thickness, basically determine the damping effect on the axial impacts. The greater the axial thickness, the greater the damping of the axial impacts. The radial dimensions of the intermediate element, together with the elastic properties of the material, influence the torsional rigidity of the connection between the drive section and the output section. The greater the radial dimensions of the intermediate element, the greater the torsional rigidity. A disk with large radial dimensions and a small axial thickness provides the best torsional rigidity, even if a relatively soft elastic material is used for the intermediate element so as to improve the damping effect.

In order to permit the dimensions of the intermediate element to be enlarged, the drive section and/or the output section may rest against the intermediate element by way of a radially enlarged flange area.

Suitable materials for the intermediate element are ones that exhibit the desired elastic properties and are also corrosion-resistant and age-resistant. Rubber-elastic plastics are particularly suited for such materials The intermediate element may be connected to the drive section and/or the output section in any known manner, as long as this connection has at least an adequate shearing resistance in the direction of rotation. Depending on the material of the intermediate element the connection may be produced by means of adhesion, welding, or vulcanizing. It is also possible to inject the intermediate element onto the drive section and/or the output section in an injection molding process. These processes may also be used in combination, e.g., by injecting the intermediate element onto the drive or output section and then attaching it to the other section by gluing, welding, or the like.

In a preferred design the drive section and the output section engage with each other axially by means of a pin and a borehole, such that the pin is centered axially in the borehole in movable fashion. The intermediate element coaxially surrounds the pin. This prevents the axial resilience of the intermediate element from tipping the axis of the output section relative to the axis of the drive section, and thereby causing errors of alignment.

Next the invention will be described in greater detail on the basis of an exemplary embodiment depicted in the drawing. Shown are:

DETAILED DESCRIPTION OF THE DRAWINGS

Figure 1:
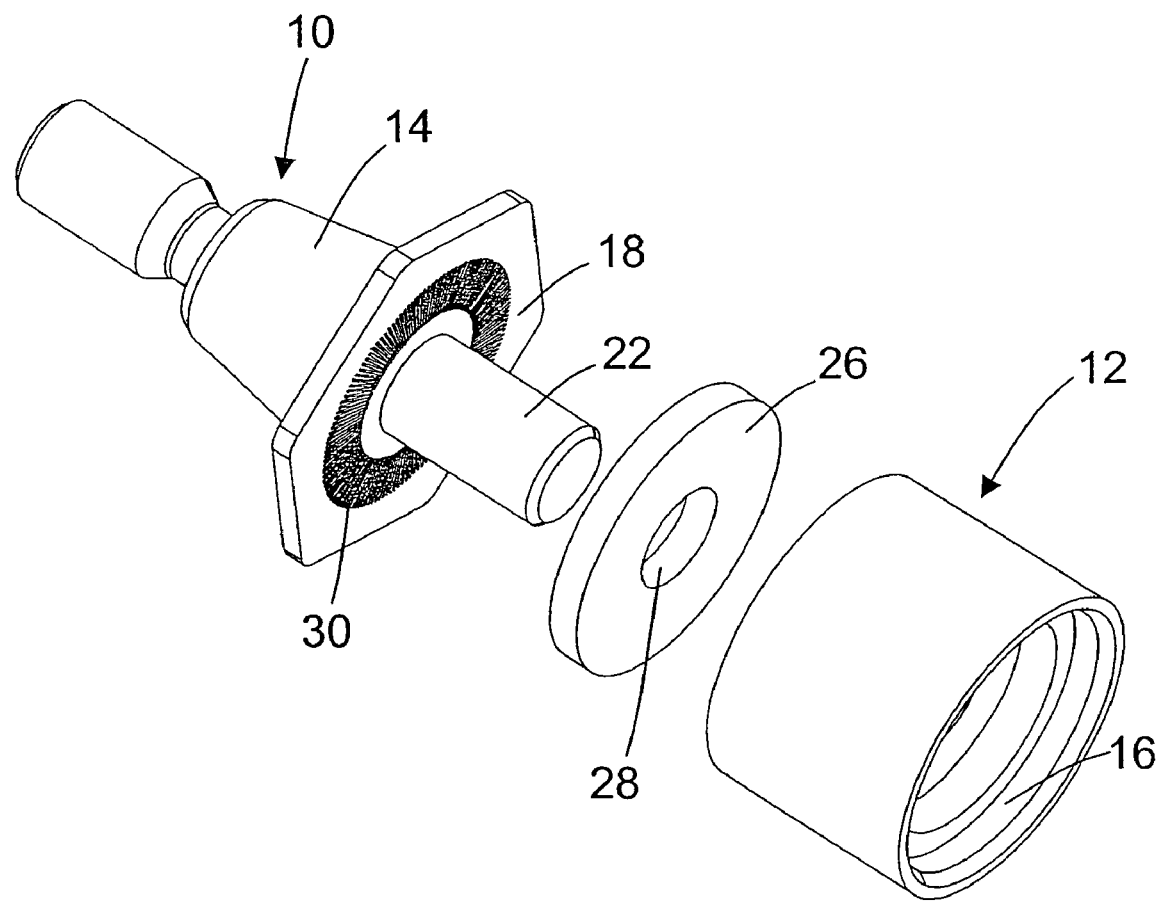
FIG. 1 an exploded view of the shaft of the rotary encoder
Figure 2:
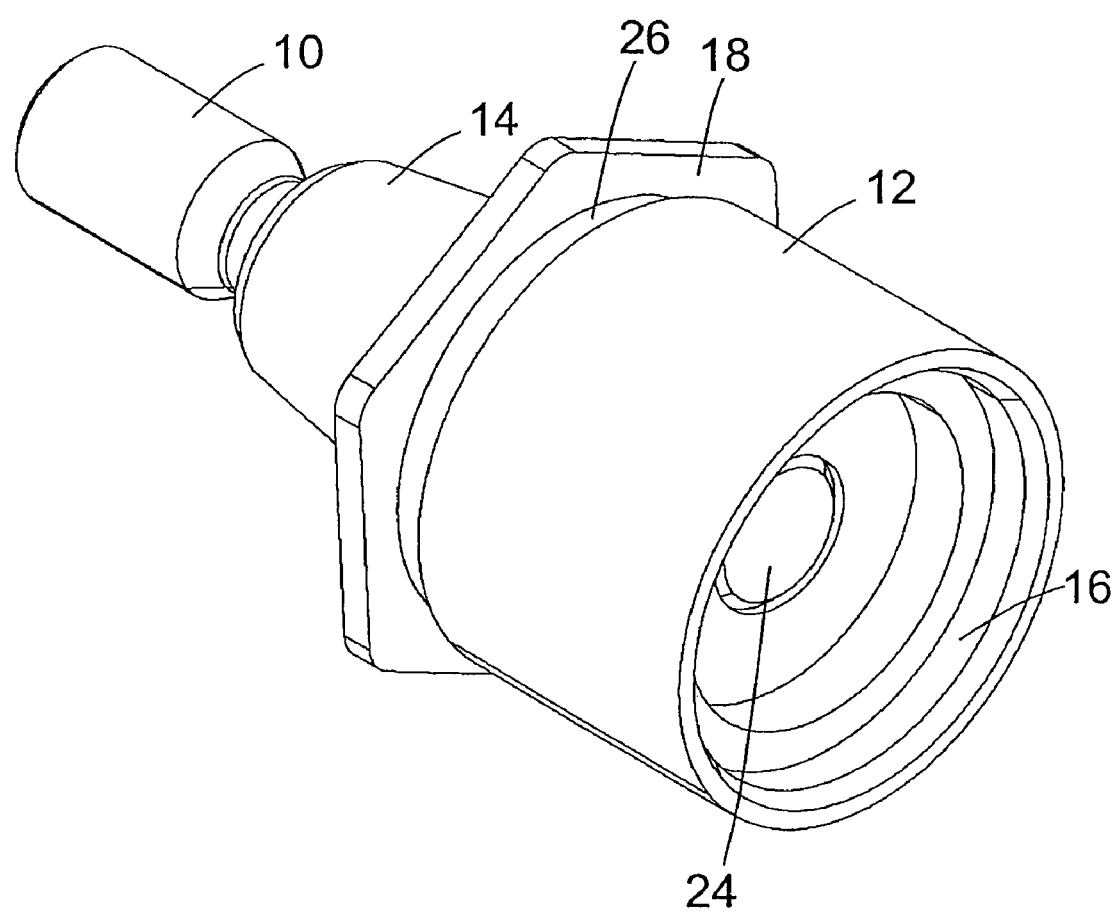
FIG. 2 a perspective view of the shaft
Figure 3:
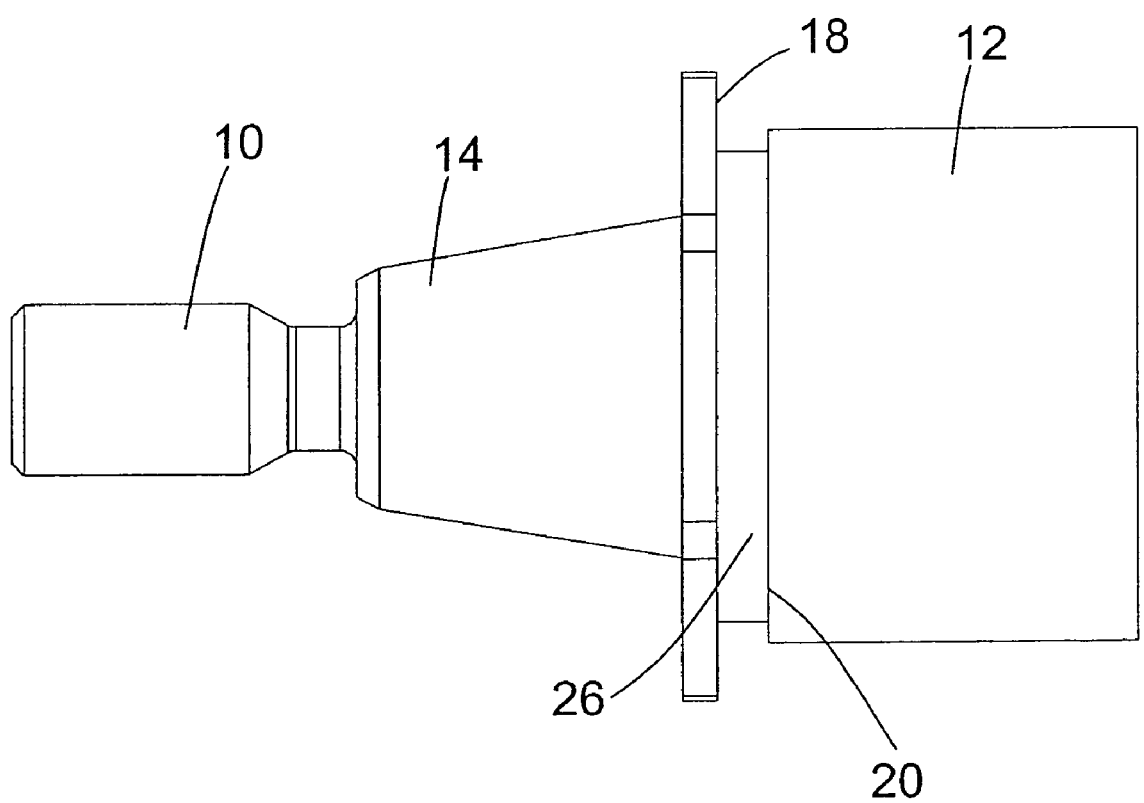
FIG. 3 a side view of the shaft.

The shaft of a rotary encoder exhibits a drive section 10 and an output section 12. The drive section 10 is rigidly connected to the object being measured, e.g., the shaft of a motor. To this end, the drive section 10 shown in the exemplary embodiment can be inserted with a cone 14 into the measured object and can be axially positioned in torque-proof fashion. At its end opposite to the drive section 10, the output section 12 exhibits a seat 16, in which an undepicted material measure, e.g., a code disk, can be inserted in torque-proof fashion. The type of coupling for the drive section 10 and the measured object, and the design of the material measure and its fastening to the output section 12, are not the subject matter of the invention and may be chosen in any manner known to the specialist.

On its end facing the output section 12 the drive section 10 exhibits a radially enlarged flange area 18. Facing the flange area 18 of the drive section 10, the output section 12 exhibits a flange area 20. Formed to the drive section 10 is a cylindrical pin 22, which is axially aligned and centrically oriented toward the output section 12. A borehole 24 is formed axially in the center of the output section 12. The diameter of this borehole 24 is so selected that the borehole 24 receives the pin 22 in axially sliding fashion, with a minimum of radial play.

Inserted between the flange area 18 of the drive section 10 and the flange area 20 of the output section 12 is an intermediate element 26, which takes the form of a flat annular disk. The intermediate element 26 is radially centered on the pin 22 by means of a central hole 28. The outer diameter of the intermediate element 26 matches the outer diameter of the flange area 20 of the output section 12. The axial thickness of the intermediate element 26 is smaller than the radius of the intermediate element 26. The intermediate element 26 consists of soft, rubber-elastic material, e.g., an appropriate plastic.

The intermediate element 26 is connected in torque-proof fashion both to the flange area 18 of the drive section 10, on one side, and to the flange area 20 of the output section 12, on the other side. Here the intermediate element 26 can be glued or welded to the flange areas 18 and 20, e.g., by means of vulcanization. It is also possible to inject the intermediate element 26 onto one or both flange areas 18 and 20 using the injection molding process. To improve and ensure the torque-proof connection between the intermediate element 26 and the flange areas 18 and 20, these flange areas 18 and 20 may be provided with a radial corrugation 30. A form-fit in the direction of rotation can be further produced by allowing the intermediate element 26 to engage in boreholes, depressions, or the like, in the flange areas 18 and 20 or by allowing the intermediate element 26 to engage with pins in the flange areas.

If, when the rotary encoder is mounted, axial impacts are exerted by the measured object on the drive section 10 that is rigidly coupled to this object, the intermediate element 26 dampers the transmission of these impacts to the output section 12, and thus to the material measure and the measuring device. A favorable damping effect is provided by an intermediate element 26 made of a material with a hardness of 50 to 70 shore. The relatively large radial length of the intermediate element 26 means that the intermediate element 26 has a high rigidity of twist in the rotating direction and thus forms a torsion-proof connection between the drive section 10 and the output section 12. As a consequence of the axial guidance of the pin 22 in the borehole 24, the axis of the output section 12 cannot improperly tip against the axis of the drive section, despite the axial resilience of the intermediate element 26.

LIST OF REFERENCE NUMERALS 10 drive section
12 output section
14 cone
16 seat
18 flange area
20 flange area
22 pin
24 borehole
26 intermediate element
28 hole
30 corrugation

The invention claimed is:

1. A rotary encoder, with a shaft which is coupled in torque-proof fashion to a rotating object to be measured, and with a material measure that is connected to the shaft at a true angle of rotation, wherein the shaft is divided axially into a drive section (10) that is coupled to the object being measured and an output section (12) that is connected to the material measure, and the drive section (10) and the output section (12) are connected by an intermediate element (26) in rigidly rotating but axially resilient fashion.

2. A rotary encoder according to claim 1, wherein the intermediate element (26) is designed as a disk that is coaxial with the shaft and that is inserted between the drive section (10) and the output section (12), said intermediate element (26) having a radius that is greater than its axial thickness.

3. A rotary encoder according to claim 2, wherein the drive section (10) and/or the output section (12) exhibit a radially enlarged flange area (18, 20), to which the intermediate element (26) is secured.

4. A rotary encoder according to claim 1, wherein the intermediate element (26) consists of a soft, rubber-elastic material, particularly plastic.

5. A rotary encoder according to claim 1, wherein the intermediate element (26) is glued to the drive section (10) and/or the output section (12).

6. A rotary encoder according to claim 1, wherein the intermediate element (26) is welded to the drive section (10) and/or the output section (12).

7. A rotary encoder according to claim 1, wherein the intermediate element (26) is injected onto the drive section (10) and/or the output section (12).

8. A rotary encoder according to claim 1, wherein the drive section (10) and the output section (12) interlock with each other by means of a pin (22) that is guided into a borehole (24) in axially centric fashion.

9. A rotary encoder according to claim 8, wherein the intermediate element (26) encompasses the pin (22) concentrically.

* * * * *